United States Patent [19]

Hagenmaier et al.

[11] Patent Number: 5,512,259

[45] Date of Patent: Apr. 30, 1996

[54] PROCESS FOR REDUCING EMISSIONS OF ORGANIC HALOGEN COMPOUNDS FROM INCINERATION SYSTEMS

[75] Inventors: Hanspaul Hagenmaier, Tubingen; Gunther Mittelbach, Witten, both of Germany

[73] Assignee: Babcock Deutsche Babcock Anlagen AG, Krefeld-Uerdingen, Germany

[21] Appl. No.: 690,976

[22] PCT Filed: Oct. 8, 1990

[86] PCT No.: PCT/EP90/01685

§ 371 Date: Jul. 29, 1992

§ 102(e) Date: Jul. 29, 1992

[87] PCT Pub. No.: WO91/04780

PCT Pub. Date: Apr. 18, 1991

[30] Foreign Application Priority Data

Oct. 6, 1989 [DE] Germany .......................... 39 33 480.5
Jul. 3, 1990 [DE] Germany .......................... 40 21 135.5

[51] Int. Cl.$^6$ .................................. B01D 53/70
[52] U.S. Cl. .................. 423/239.1; 423/240 S; 423/245.3
[58] Field of Search ............ 423/245.3, 240 S, 423/239.1

[56] References Cited

U.S. PATENT DOCUMENTS

| 4,824,360 | 4/1989 | Janka ................................... 423/239.1 |
| 5,087,430 | 2/1992 | Hanada et al. ...................... 423/245.3 |
| 5,254,797 | 10/1993 | Imoto et al. ......................... 423/240 S |
| 5,276,250 | 1/1994 | Hagenmaier et al. ................. 588/213 |

FOREIGN PATENT DOCUMENTS

| 3531810 | 3/1987 | Germany .......................... B01J 23/22 |
| 3636250 | 4/1988 | Germany .......................... 423/245.3 |
| 3804722 | 8/1989 | Germany .......................... 423/245.3 |
| 793631 | 1/1981 | U.S.S.R. .............................. 423/245.3 |
| WO88/00483 | 1/1988 | WIPO .............................. A62D 3/00 |

OTHER PUBLICATIONS

VDI Report 730, *Report of the Meeting of the VDI Commission for Clean Air,* "Progress in the Thermal, Catalytic, and Sorptive Purification of Off–Gas", Mar. 1–2, 1989, pp. 126, 250 and 251.

*Primary Examiner*—Wayne Langel
*Assistant Examiner*—Stuart L. Hendrickson
*Attorney, Agent, or Firm*—Pennie & Edmonds

[57] ABSTRACT

The invention relates to a method for reducing the emission of organic products of incomplete combustion in the off-gases of incineration systems, wherein the off-gas containing the organic products is treated at a temperature from 150° C. to 500° C., under oxidative conditions, with a denox catalyst or a modified denox catalyst. A method is also provided wherein a denox catalyst may be utilized for removing organic products and nitrogen oxides from off-gases.

21 Claims, No Drawings

5,512,259

PROCESS FOR REDUCING EMISSIONS OF ORGANIC HALOGEN COMPOUNDS FROM INCINERATION SYSTEMS

TECHNICAL FIELD

The invention relates to a method for reducing the emission of organic products from incomplete combustion, including poly-halogenated di-benzo-dioxines and di-benzo-furanes in the off-gases of incineration systems.

BACKGROUND OF THE ART

Incineration systems, especially trash and waste incineration systems, still emit organic compounds as products of incomplete combustion (PIC=Products of Incomplete Combustion), even after extensive purification of exhaust gas. A portion of these PICs consists of organic halogen compounds (chlorobenzoles, chloro-phenols, poly-chlorinated biphenyls, poly-halogenated (chlorine, bromine) di-benzo-dioxines and di-benzo-furanes, etc.). These compounds are toxic and are difficult to decompose. Therefore such compounds present in emitted incineration gasses pose a serious pollution problem. The effects of such pollutants are often delayed and thus great damage may be done before identification of the pollution problem.

From the point of view of the potential health risk of emissions from incineration systems, the poly-halogenated di-benzo-dioxines and di-benzo-furanes (all collected together under the brief name of "dioxines") are especially important. To reduce the emission of dioxines in off-gases, two methods are currently subjects of laboratory and pilot studies.

In a first method, prevention of the de novo synthesis of dioxines is accomplished by either poisoning the catalyst system that forms the dioxines; or by altering reaction temperatures.

It is disclosed in EP-A-87 110 006 that dioxines may arise at temperature ranges of from about 250° C. to 400° C., through a catalytic de novo synthesis on filter dusts which form in trash and waste incineration systems. One method for controlling this de novo synthesis comprises specifically poisoning the catalysts which are responsible for the de novo synthesis. Poisoning the catalyst may be accomplished by settling the crude gas dusts at high temperatures thereby causing the destruction of dioxin to predominate over the formation of dioxin.

In contrast, by settling the crude gas dusts at a temperature below 180° C., de novo synthesis can not take place since it requires the higher temperatures discussed above. Current experiments with catalyst poisons aim exclusively at reducing the formation of dioxin. However, there are other problems which may occur when catalyst poisons are used which will not be discussed in detail here.

A second method of reducing dioxin emissions comprises settling dioxines on adsorption materials, such as activated charcoal. In this method, dioxines which are not completely removed by electro-filters or textile filters are adsorbed onto activated charcoal through which the off-gas is conducted. When activated charcoal is utilized to remove dioxines from exhaust gas emissions, there is a risk that, besides the dioxines, only a portion of the remaining PICs will be removed from the off-gas. Furthermore a follow-up treatment of the dioxin loaded activated charcoal is required in order to destroy the dioxines and other halogenated aromatic compounds, corresponding to the method described in the EP-A-87 110 006.

What is needed is a method for reducing the emission of organic products of incomplete combustion in the off-gas from incineration systems wherein the organic products are removed as thoroughly as possible.

SUMMARY OF THE INVENTION

Now in accordance with the present invention a method for substantially reducing organic products of incomplete combustion in off-gas from incineration systems is provided. In the present method, off-gas is directed through a denox catalyst under oxidative conditions whereby organic products contained within the off-gas are effectively degraded.

The organic products of incomplete combustion which are included in off-gas, and which are effectively degraded by the present method include organic halogen compounds such as halogenated aromatic compounds, e.g., chlorobenzoles, chloro-phenols, poly-chlorinated biphenyls, poly-halogenated (especially poly-chlorinated, poly-brominated) di-benzo-dioxines and di-benzo-furanes, and halogenated aliphatic compounds, e.g., tri- and tetra-chloro-ethene, hexa-chloro-cyclohexane, etc. These organic compounds are especially found in off-gases from incineration systems, and especially trash and waste incineration systems.

The present method effectively degrades the organic compounds described above by directing a flow of the off-gas which contains the organic products through the denox catalyst at a temperature from about 150° C. to 500° C. Degradation of the organic compounds occurs under oxidative conditions within the denox catalyst or a modification thereof. Denox catalysts, as further discussed below had heretofore been utilized under reducing conditions. Reducing conditions were required to accomplish the reduction and elimination of $NO_x$ from gas emissions for which the denox catalyst was designed.

Now in accordance with the present invention, it has been found that by directing emitted gas containing organic products of incomplete combustion through a denox catalyst under oxidative conditions at a temperature of 150° to 500° C., these organic products are effectively degraded.

In a first alternative embodiment of the present invention, a method for removing organic components and $NO_x$ from off-gas is provided. In the first alternative embodiment of the present invention, off-gasses are first passed over a denox catalyst (or a modified version thereof). During this first passage of the off-gas over the catalyst, oxidative conditions are maintained so that an oxidative degradation of organic products of incomplete combustion is accomplished. A preferred working temperature range of about 300° to 500° C. is maintained during this first passage so as to increase the degradation of the organic products.

After the first passage of the off-gas over the catalyst, ammonia is added to the off-gas so as to achieve reductive conditions required to reduce $NO_x$ present in the gas. The preferred temperature for reducing nitrogen oxides in the off-gas ranges from about 150° to 300° C.

The first alternative embodiment of the present invention provides a method which utilizes in oxidation step followed by a reduction step in order to remove both organic products of incomplete combustion as well as nitrogen oxides from off-gas.

In the second alternative embodiment of the present invention, a method of removing both organic products of incomplete combustion and nitrogen oxides from off-air is provided wherein a reduction step followed by an oxidation step is utilized. In the second alternative embodiment ammonia is initially added to off-gas prior to directing said gas through a denox catalyst. The gas is then directed over the denox catalyst at a temperature of from about 150° to 300° C. wherein the reduction and thus elimination of nitrogen oxides occurs. After removal of $NO_x$, in the denox catalyst, the concentration of ammonia in the gas is reduced so as to allow the gas to be recycled through the catalyst at oxidative conditions. As the off-gas recycles through the catalyst, oxidative degradation of the organic products occurs so as to substantially reduce such products in final off-gas emissions.

BRIEF DESCRIPTION OF THE FIGURES

FIG. 5 is a graph which shows the relation between the specific catalyst surface and the rate at which dioxin is destroyed.

DETAILED DESCRIPTION

Figure 3:
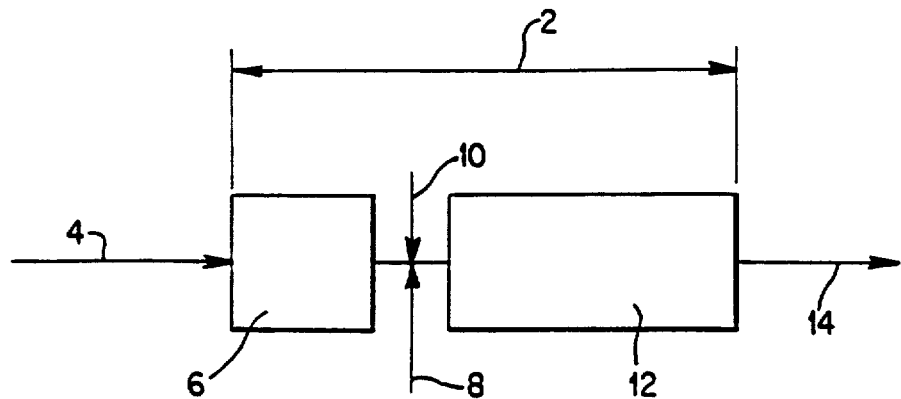
FIG. 3 is a schematic representation of the purification of an off-gas which contains $NO_x$ and PICs.

Denox catalysts have been known for a long time and are used for the catalytic reduction of nitrogen oxides ($NO_x$), with ammonia in connection with nitric acid systems and large-scale furnaces. Surprisingly, it has now been found that these well-known denox catalysts are able to degrade organic products of incomplete combustion when they are operated under oxidative conditions. Denox catalysts and their manufacture are described in the VDI Reports No. 730, 1989, pages 121 to 156, as well as the DE-3,433,197, 3,438,367 and 3,531,810, and U.S. Pat. Nos. 4,085,193 and 4,378,338. These references are hereby incorporated by reference.

It is preferred to utilize denox catalysts which are modified to increase the conversion rate of $SO_2$ into $SO_3$ and/or the $NO_x$ degradation rate. This increase in conversion rate is achieved by incorporating additives (donors), such as tungsten oxide ($WO_3$), molybdenum oxide ($MoO_3$) and/or especially vanadium oxide ($V_2O_3$). The type and amount of additives are selected so that the above conversion rate and the degradation rate are increased.

Denox catalysts which are preferred according to the method of the present invention are those of the titanium oxide, iron oxide or zeolite type. In the preferred method of the present invention, these catalysts contain the usual donors. Modified denox catalysts which additionally contain nickel oxide, chromium oxide, copper oxide, and/or cobalt oxide as donors are especially preferred. The donors are preferably contained in an amount of 0.1 to 20 weight percent and more preferably 0.5 to 10 weight percent, relative to the total weight of the catalyst.

Titanium oxide catalysts are preferred, especially those with a titanium oxide content at least 70 weight percent, relative to the total weight of the catalyst. A preferred titanium oxide catalyst composition (weight % relative to the total weight) especially suited for practicing the method of the present invention comprises:

| | |
|---|---|
| $TiO_2$ | 70–80% |
| $WO_3$ | 0–10%, preferably 2–10% |
| $V_2O_5$ | 0.5–3%, preferably 0.5–5% |
| $MoO_3$ | 0–5%, preferably 0–4% |
| Remainder: | fillers, e.g. glass fibers, clay, possible $SO_4$ |
| Pore volume: | 100–400 mm²/g |
| BET surface: | 20–100 m²/g |
| Average pore radius: | 50–100 Å |

There is a limit as to how much additive, especially $V_2O_5$, can be incorporated in the denox catalyst. As the $V_2O_5$ content of the catalyst is increased beyond a limit, essentially only the conversion rate of $SO_2$ to $SO_3$ is increased while the $NO_x$ degradation rate remains virtually unchanged. High rates of $SO_3$ formation results in corrosion and plugging of colder system components that are connected after the catalyst by condensing sulfuric acid or salts. Therefore it is desirable to avoid increased rates of $SO_3$ production.

In the case of off-gases with a low $SO_2$ content (e.g. after a smoke-gas scrubber), high $SO_3$ formation rates are less important. In such cases it is possible, and advantageous to use catalysts with a high $SO_2$ conversion rate. For example, it appears that the model substance tetra-chloro-ethene is destroyed 70% at a temperature of 300° C., with a catalyst having a low $V_2O_5$ content, which is usually designated as a "high dust" type, with an SV-value of 2000. On the other hand, a catalyst with a higher $V_2O_5$ content, which is designated as a "low dust" type, under the same conditions achieves a degradation rate in excess of 95%.

The method of the present invention can also utilize the catalyst described in the EP-A-87 110 006.

The method of the present invention must be implemented under oxidative conditions. Therefore, the present invention requires that the denox catalysts not be used under the conditions (reducing conditions), with which it was used in the prior art for the degradation of nitrogen oxides. Consequently, the inventive method is implemented so that sufficient oxygen is present for oxygen adsorption to predominate over the adsorption of reducing substances. It is preferred that the catalyst be utilized with off-gas containing at least about 6 percent $O_2$ and no greater than 50 ppm of $NH_3$ present. It is more preferred to practice the method of the present invention with an $O_2$ content of 6 to 12 percent. $O_2$ content of the off-gas may be advantageously adjusted with the addition of air or an $O_2$-enriched air.

In the method of the present invention, off-gas is treated with the denox catalyst at a preferred temperature range of from about 150° to 500° C. A temperature range of from about 200° to 400° C. is more preferred while a temperature range of from about 250° to 350° C. is most preferred.

Figure 1:
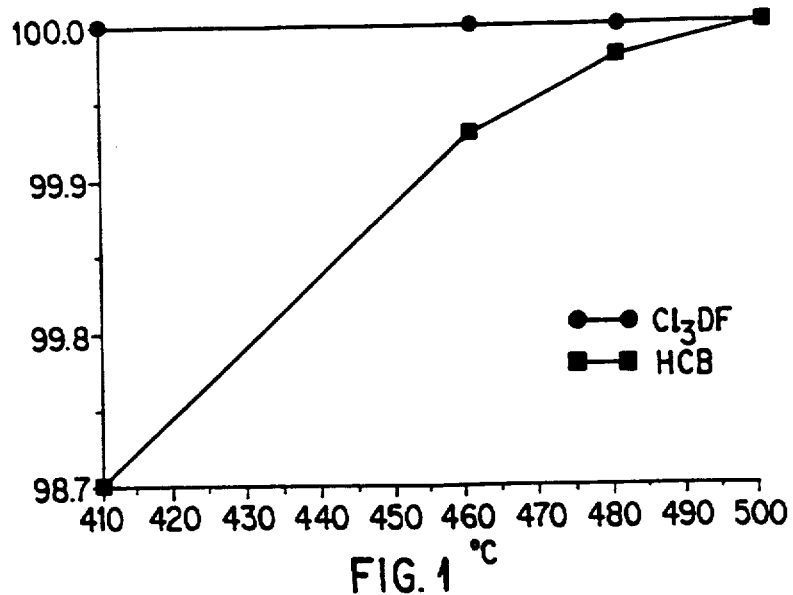
FIG. 1 is a graph demonstrating the catalytic oxidation of tri-chloro-di-benzo-furane (TriCDF) and hexa-chloro-benzol (HCB) as a function of catalyst temperature.

FIG. 1 illustrates the catalytic oxidation of triCDF (tri-chloro-di-benzo-furane) represented by the line which includes overlying circles and HCB (hexa- chloro-benzol) represented by the line which includes overlying squares. The x-axis of the graph is calibrated in degree centigrade (catalyst treatment temperature).while the y-axis represents percent degradation. As can be seen by the chart, excellent degradation of organic products occurs at a temperature of about 410° C. However, increasing the temperature of catalytic treatment to 500° C. results in 100 percent degradation.

The off-gases are generally conducted over the catalysts, which are disposed as a fixed bed or a fluidized bed. Catalysts configuration is not critical; they can be designed in any well known fashion. The catalyst may be configured, e.g. in a honey-comb structure as a solid material with cell openings between 2 to 10 mm, or as pellets, etc., or they can be applied to expanded metal plates.

The specific (geometric) surface of the catalyst, relative to the amount of off-gas that is put through (also expressed by the reciprocal of the so-called AV-value (area velocity), is guided, among other things, by the amount of pollutant and by the desired degradation rate. FIG. 5 is a graph illustrating the relationship between the specific catalyst surface and the rate at which pollutants are destroyed (using dioxin as an example). The x-axis represents specific catalyst surface (relative to off-gas flow-through) calculated as 1/AV. The y-axis of the graph represents PCDD/PCF content in the off-gas TE (NATO). The three lines charted on the graph represent three different temperature ranges of treatment with squares corresponding to 290° C., triangles 320° C. and circles 350° C.

The method of the present invention can also be implemented at high space velocities up to about 5000 $h^{-1}$. A velocity, for example of up to 2000 $h^{-1}$ is optimal. It has appeared that with high space velocities, depending on the chosen conditions, practically complete destruction of the products of incomplete combustion occurs.

Figure 2:
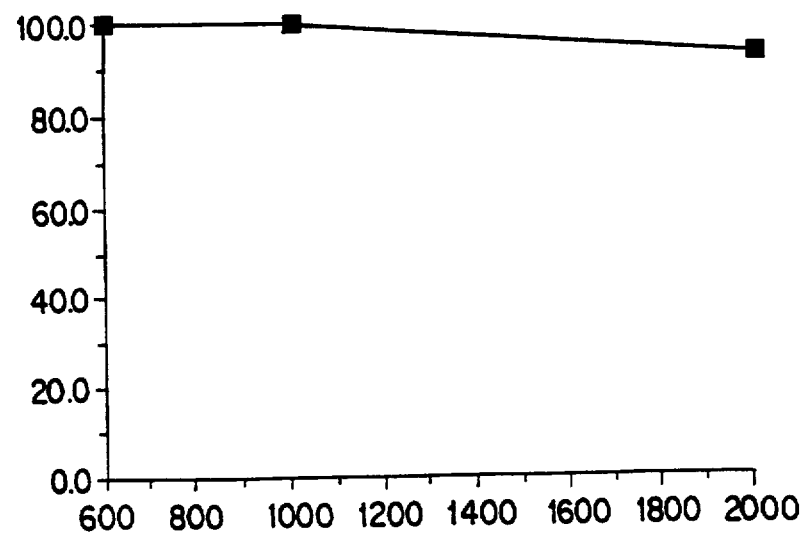
FIG. 2 is a graph demonstrating the catalytic oxidation of HCB as a function of the spatial velocity of the off-gas.

In order to obtain higher rates of destruction, a correspondingly large specific catalyst surface must therefore be provided. Space velocity adjustment / alone-is not sufficient for obtaining these increased rates. FIG. 2 is a graph representing organic product of incomplete combustion degradation in accordance with the present invention. FIG. 2 shows the results of 450° C. catalysis of off-gas. Specifically, the graph represents the effect of space velocity upon the percentage of degradation of organic products in the method of the present invention. The x axis of the graph is calibrated for space velocity in units of $h^{-1}$ and the y axis of the chart is calibrated for percentage of organic product degradation. As can be seen in FIG. 2, a space velocity of from 600 to 1000 $h^{-1}$ of off-gas at 450° C. resulted in 100 percent degradation of the organic products. However, as a speed of 2000 $h^{-1}$ is approached, degradation begins to decrease.

The size of the catalyst required for high rates of organic product degradation depends on the catalyst temperature, the retention time (space velocity), the catalyst surface per volume, and the efficiency of the catalyst. With the inventive catalysts, especially those with comparatively high denox activity and high $SO_2$ conversion rate, practically complete destruction of the products of incomplete combustion can be achieved with area velocities (AV values) of less than about 4 m/h.

Trash and waste incineration systems in the future must be equipped with apparatus to reduce $NO_x$ emissions in order to be able to comply with low $NO_x$ emission values required by future legal directives. In order to achieve these low values, selective catalytic reduction of nitrogen oxides with denox catalysts in the presence of ammonia is the anticipated process. Nitrogen oxides are reduced by denox catalysts to nitrogen when a reducing atmosphere (produced by adding ammonia), is present.

According to the present invention it is now possible to eliminate both the nitrogen oxides and the products of incomplete combustion in one method by using one catalyst.

In a first alternative method of the present invention off gases are conducted over a denox catalyst (or modified denox catalyst), or catalysts according to the EP-A- 87 110 006). In this method off-gas is first treated with the catalyst under oxidative conditions so that substantially all organic products of incomplete combustion are degraded. Such oxidative conditions can be created, as discussed above, by controlling the oxygen content of the off-gas so as to achieve the preferred oxygen content.

As already mentioned, the catalyst volume that is needed depends on the catalyst temperature, the retention time, and the efficiency of the catalyst. It is preferred to treat the off-gas in this oxidative step at a temperature range of from 300° C. to 500° C.

After treating the PICs with an oxidative degradation with the denox catalyst, catalyst conditions are altered so as to create a reducing environment. Nitrogen oxides in the off-gas which is treated under reducing conditions are effectively reduced to nitrogen.

In order to achieve reducing conditions, after the off-gas has traversed the catalyst for oxidative degradation of organics, ammonia is supplied in excess so that reductive conditions prevail for the reduction of the nitrogen oxides. The nitrogen oxides can then be reduced in well-known fashion. The preferred temperature range for reduction of nitrogen oxides ranges from about 150° C. to 300° C.

The first alternative method of the present invention therefore initially treats off-gas with oxidative degradation to substantially degrade PICs and thereafter, utilizing the same catalyst under reducing conditions, reduces $NO_x$ to nitrogen. This mode of operation is explained in more detail in FIG. 3.

FIG. 3 schematically illustrates an example according to the first alternative method of the present invention. Off-gas 4 is initially directed into a first portion 6 of the denox catalyst 2 wherein oxidative degradation of organic products occurs. The temperature of the gas ranges from about 150° to 500° C. After the gas is oxidatively degraded in first portion 6 of the denox catalyst, $NH_3$ is added in order to promote reduction of nitrogen oxides in a reduction treatment of the gas in the denox catalyst portion 12. A heat exchanger 10 may utilized between the oxidative and reductive treatments of the off gas so as to provide more efficient reduction of nitrogen oxides. Off-gas 14 is thereafter emitted after removal of nitrogen oxides and degradation of organic products.

In the second alternative method of the present invention off-gas is first treated by conducting the gas over a denox catalyst under reductive conditions created through addition of ammonia. This treatment results in the degradation of the nitrogen oxides to nitrogen. After the nitrogen oxides are degraded, the off-gases are conducted over the catalysts (as discussed above), under oxidative conditions, in order to, degrade the PICs. For this oxidative degradation, it is preferred that the ammonia concentration is no greater than 50 ppm. It is especially preferred to oxidatively treat the off gas at an ammonia concentration which is no greater than 20 ppm and most preferred to limit ammonia concentration to no greater than 10 ppm.

Figure 4:
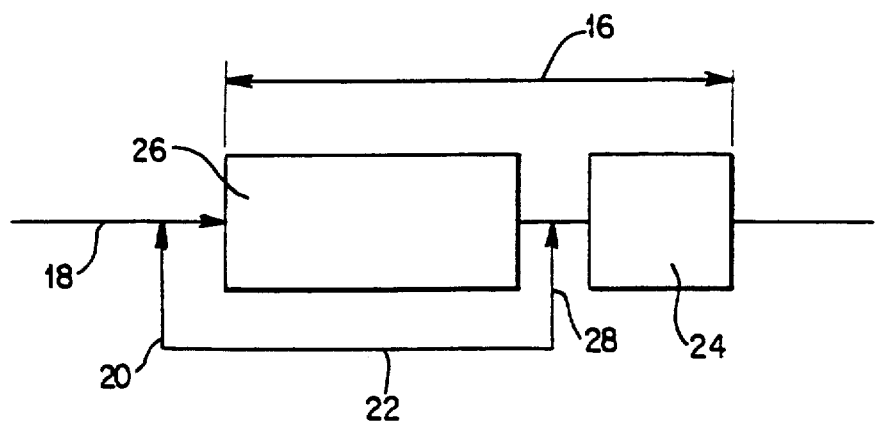
FIG. 4 shows a variant of the process shown in FIG. 3.

FIG. 4 illustrates an example in accordance with the second alternative method of the present invention. Off-gas 18 is initially introduced into a first portion 26 of the denox catalyst 16 for reduction of nitrogen oxides. $NH_3$ 20 is added to the off-gas just prior to reduction treatment in order to provide the reducing conditions required. After passing through the first portion 26 of the denox catalyst, the off-gas then may be recycled through the first portion in order to remove any residual nitrogen oxides. The quantity of ammonia present in the off-gas at point 28 must be less than 40 ppm in order for the second portion 24 of the denox catalyst to function as an oxidative degradation catalyst of organic products. Oxygen or air may also be applied at point 28 in order to assure oxidative conditions within portion 24.

According to the present invention, creation of an oxidative environment can be accomplished by controlling the ammonia supply under verifiable conditions, or by feeding in air or oxygen-enriched air following the reduction stage. This mode of operation is shown in greater detail in FIG. 4.

Example 1

In a laboratory experiment, a denox catalyst (honeycomb, volume 200 ml), of the iron oxide type (Didier catalyst) was investigated regarding its efficiency in destroying the model substances hexa-chloro-benzol and 2,4,8-tri-chloro-di-benzo-furane. FIG. 1 shows the temperature dependence of the degradation (destruction efficiency) for a space velocity of 1000/h. FIG. 2 shows the relation of the space velocity at 450° C. on the efficiency of organic product degradation.

If ammonia at a concentration of 1000 ppm is introduced before the denox catalyst, no oxidation effect can be seen (degradation+0%).

Example 2

In a waste incineration system, a partial stream of off-gas was heated to 260° C.–280° C., and then $NH_3$ was applied to it. Here, the volume concentration of $NH_3$ per $m^3$ was less than the $NO_x$ content of the off-gases. The processed stream of off-gases was then conducted over a denox catalyst.

The composition of the catalyst was as follows:

| | |
|---|---|
| $TiO_2$ | 75 weight % |
| $V_2O_5$ | 4 weight % |
| $WO_3$ | 8 weight % |
| Glass fibers | 7 weight % |
| Remainder | inert material |
| Pore volume | 300 $mm^3/g$ |
| Specific surface | 60 $m^2/g$ |

After various catalyst volumes were traversed, the concentration of PCDD/PCDF (penta-chloro-di-benzo-dioxin/penta-chloro-di-benzo-furane) was measured. The samples were taken behind the catalyst, a reference sample was taken in front of the ammonia nozzle. The catalyst temperature was 260° C. to 280° C. The results of this investigation are shown in Table 1.

Only after the fourth catalyst layer, could a clear decrease of the PCDD/PCDF concentration (>80%) reproducibly be detected in several experiments. The amount of added ammonia was constant and was not matched to the respective $NO_x$ concentration. The ammonia concentration behind the third layer, in connection with the PCDD/PCDF measurement after the fourth layer (Table 1), was less than 10 ppm.

Example 3

In a modification of Example 2, the catalyst volume was increased, the off-gas temperature was increased to above 300° C., and the $NH_3$ dosing mechanism was shut off. Various test results are shown in Table 2. Destruction rates above 95% were achieved.

TABLE 1

PCDD/PCDF content in off-gas samples before entering the denox catalyst volumes
First layer = entry of off-gas
Fourth layer = end of catalyst

| | After fourth layer | | After third layer | | After second layer | | After first layer | |
|---|---|---|---|---|---|---|---|---|
| | Reference ng/Ncbm | Catalyat ng/Ncbm | Reference ng/Ncbm | Catalyst ng/Ncbm | Reference ng/Ncbm | Catalyst ng/Ncbm | Reference ng/Ncbm | Catalyst ng/Ncbm |
| Tetra CDD | 6.3 | 0.9 | 3.2 | 2.6 | 2.9 | 3.1 | 3.4 | 1.8 |
| Penta COD | 14.3 | 2.4 | 5.9 | 5.7 | 7.3 | 7.9 | 5.2 | 4.0 |
| Hexs CDD | 41.0 | 3.0 | 16.7 | 10.8 | 14.9 | 15.0 | 13.4 | 4.6 |
| Hepta CDD | 65.0 | 10.2 | 48.1 | 36.9 | 43.5 | 46.0 | 29.0 | 10.6 |
| Octa CDD | 130.7 | 16.3 | 83.2 | 60.4 | 73.7 | 77.4 | 56.4 | 16.5 |
| Total PCDD | 257.3 | 32.8 | 157.1 | 116.4 | 142.3 | 149.4 | 107.4 | 37.5 |
| Tetra CDF | 69.4 | 8.5 | 40.2 | 39.1 | 36.6 | 49.5 | 38.6 | 37.6 |
| Penta CDF | 72.2 | 9.0 | 38.5 | 42.4 | 37.7 | 50.9 | 41.1 | 27.6 |
| Hexa CDF | 61.4 | 4.9 | 40.5 | 26.2 | 35.9 | 35.6 | 31.6 | 18.0 |
| Hepta CDF | 48.9 | 5.6 | 31.4 | 31.0 | 30.1 | 33.8 | 23.8 | 11.4 |
| Octa CDF | 24.6 | 2.3 | 11.9 | 11.2 | 13.5 | 10.8 | 10.4 | 4.4 |
| Total PCDF | 276.5 | 29.3 | 162.5 | 149.9 | 153.8 | 180.6 | 145.5 | 99.0 |
| TCDD Equivalence | 8.3 | 1.1 | 4.5 | 3.6 | 4.2 | 4.8 | 4.0 | 2.2 |

Reduction of the PCDD/PCDF content in TE: 87%

TABLE 2

|  | Test 1 | | Test 2 | | Test 3 | | Test 4 | |
| --- | --- | --- | --- | --- | --- | --- | --- | --- |
|  | Before Catalyst ng/Ncbm | After Catalyst ng/Ncbm | Before Catalyst ng/Ncbm | After Catalyst ng/Ncbm | Before Catalyst ng/Ncbm | After Catalyst ng/Ncbm | Before Catalyst ng/Ncbm | After Catalyst ng/Ncbm |
| Tetrachlorodibenzodioxine | 19.4 | 0.17 | 23.9 | 0.19 | 7.4 | n.n. | 4.8 | n.n. |
| Pentachlorodibenzodioxine | 18.3 | 0.21 | 25.2 | 0.37 | 8.5 | 0.16 | 5.8 | 0.07 |
| Hexachlorodibenzodioxine | 23.1 | 0.32 | 27.2 | 0.55 | 9.5 | 0.23 | 6.1 | 0.29 |
| Heptachlorodibenzodioxine | 24.6 | 0.32 | 18.4 | 0.44 | 8.7 | 0.31 | 3.2 | 0.16 |
| Octachlorodibenzodioxine | 17.6 | 0.30 | 8.3 | 0.41 | 4.6 | 0.43 | 1.9 | 0.15 |
| Summe Tetra bis Octachlorodibenzodioxine | 103.0 | 1.32 | 103.0 | 1.96 | 38.7 | 1.13 | 21.8 | 0.67 |
| Tetrachlordibenzofurane | 14.8 | 0.16 | 28.8 | 0.36 | 15.9 | 0.23 | 17.2 | 0.34 |
| Pentachlordibenzofurane | 10.0 | 0.21 | 20.4 | 0.53 | 8.1 | 0.38 | 12.6 | 0.18 |
| Hexachlordibenzofurane | 11.7 | 0.25 | 9.6 | 0.35 | 7.4 | 0.25 | 6.4 | 0.13 |
| Heptachlordibenzofurane | 9.2 | 0.49 | 5.1 | 0.24 | 6.1 | 0.20 | 3.0 | 0.07 |
| Octachlordibenzofurane | 2.1 | 0.32 | 0.5 | 0.10 | 1.3 | 0.17 | 0.3 | 0.11 |
| Total Tetra bis Octachlordibenzofurane | 47.8 | 1.43 | 84.4 | 1.58 | 38.8 | 1.23 | 39.5 | 0.83 |
| 2,3,7,8-Tetrachlordibenzodioxin* | 0.04 | n.n. | 0.17 | n.n. | 0.10 | n.n. | 0.082 | n.n. |
| 1,2,3,7,8-Pentachlordibenzodioxin* | 0.37 | 0.004 | 0.47 | 0.005 | 0.28 | n.n. | 0.28 | n.n. |
| 1,2,3,4,7,8-Hexachlordibenzodioxin* | 0.37 | 0.005 | 0.58 | 0.011 | 0.37 | n.n. | 0.21 | n.n. |
| 1,2,3,6,7,8-Hexachlordibenzodioxin* | 0.83 | 0.019 | 1.24 | 0.036 | 0.56 | n.n. | 0.45 | n.n. |
| 1,2,3,7,8,9-Hexachlordibenzodioxin* | 0.51 | 0.011 |  | 0.025 | 0.41 | n.n. | 0.32 | n.n. |
| 1,2,3,4,6,7,8-Heptachlordibenzodioxin* | 12.90 | 0.160 | 9.67 | 0.250 | 4.52 | 4.52 | 1.65 | 0.080 |
| 2,3,7,8-Tetrachlordibenzofuran* | 0.51 | 0.008 | 0.63 | 0.018 | 0.399 | 0.011 | 0.46 | 0.016 |
| 1,2,3,7,8-Pentachlordibenzofuran* | 1.04 | 0.021 | 1.53 | 0.035 | 0.65 | 0.028 | 1.03 | 0.009 |
| 2,3,4,7,8-Pentachlordibenzofuran* | 0.76 | 0.014 | 1.17 | 0.023 | 0.44 | 0.016 | 0.61 | 0.006 |
| 1,2,3,4,7,8-Hexachlordibenzofuran* | 1.37 | 0.024 | 0.97 | 0.037 | 0.82 | 0.028 | 0.72 | 0.017 |
| 1,2,3,6,7,8-Hexachlordibenzofuran* | 1.43 | 0.025 | 1.09 | 0.041 | 0.89 | 0.028 | 0.75 | 0.016 |
| 1,2,3,7,8,9-Hexachlordibenzofuran* | 0.06 | 0.002 | 0.06 | 0.004 | 0.04 | 0.003 | 0.04 | 0.002 |
| 2,3,4,6,7,8-Hexachlordibenzofuran* | 1.03 | 0.027 | 0.73 | 0.030 | 0.53 | 0.025 | 0.47 | 0.010 |
| 1,2,3,4,6,7,8-Heptachlordibenzofuran* | 6.73 | 0.281 | 3.96 | 0.210 | 4.42 | 0.020 | 2.51 | 0.070 |
| 1,2,3,4,7,8,9-Heptachlordibenzofuran* | 0.61 | 0.054 | 0.13 | 0.006 | 0.43 | n.n. | 0.08 | n.n. |
| TCDD - Equivalence after BGA (TE) | 1.997 | 0.033 | 2.437 | 0.053 | 1.256 | 0.028 | 1.137 | 0.019 |
| TCDD - Equivalence after NATO-CCMS (I/TEQ) | 1.494 | 0.028 | 1.743 | 0.041 | 0.993 | 0.021 | 0.965 | 0.011 | n.n. = not detachable; the detection limit for the single components was about 0.022 mg/Ncbm
Determination PCDD/PCDF before and after the denox catalyst
Pilot facility at a domestic trash incineration system. Temperature of the catalyst: 290° C., space velocity less than 10,000/h$^{-1}$, are velocity less than 8 m/h

We claim:

1. A method of reducing emissions of organic halogen compounds in off-gas, comprising:

directing said off-gas containing organic halogen compounds through a catalyst at a temperature of 150° to 500° C. wherein oxidative conditions are provided, said catalyst comprising 70 to 80 weight percent titanium dioxide ($TiO_2$), and from 0.5 weight percent to 10 weight percent of at least one of the donors selected from the group consisting of tungsten trioxide ($WO_3$) and vanadium pentoxide ($V_2O_5$).

2. The method of claim 1 wherein said catalyst further comprises from 0.5 weight percent to 5 weight percent molybdenum trioxide ($MoO_3$).

3. The method of claim 2 wherein said temperature ranges from about 300° to 500° C.

4. The method of claim 2 wherein said temperature ranges from about 200° to 400° C.

5. The method of claim 4 wherein said temperature ranges from about 250° to 350° C.

6. The method of claim 2 wherein said off-gas is directed through said catalyst at a space velocity ranging from about 500 to 10,000 per hour ($h^{-1}$).

7. The method of claim 6 wherein said off-gas is directed through said catalyst at a space velocity ranging from about 1,000 to 10,000 per hour ($h^{-1}$).

8. The method of claim 2 wherein said off-gas is directed, and said catalyst is configured so as to provide a specific area velocity of from about 0.5 to 8 meters per hour.

9. The method of claim 8 wherein said off-gas is directed, and said catalyst is configured so as to provide a specific area velocity of from about 1 to 4 meters per hour.

10. The method of claim 2 wherein said oxidative conditions are provided by adding air to said off-gas prior to treatment in said catalyst such that said off-gas has an oxygen content of from about 6 to 12 percent.

11. A method of reducing emissions of organic halogen compounds and nitrogen oxides in off-gas comprising:

a first step of directing said off-gas containing organic halogen compounds and nitrogen oxides through a catalyst under oxidative conditions at a temperature of from about 150° to 500° C. thereby substantially diminishing organic products in said off-gas; and a second step consisting of directing said off-gas previously subjected to said first step through said catalyst under reducing conditions at a temperature of from about 150° to 300° C. thereby substantially diminishing nitrogen oxides in said off-gas, wherein said catalyst comprises 70 to 80 weight percent titanium dioxide ($TiO_2$), and from 0.5 weight percent to 10 weight percent of at least one of the donors selected from the group consisting of tungsten trioxide ($WO_3$) and vanadium pentoxide ($V_2O_5$).

12. The method of claim 11 wherein said catalyst further comprises from 0.5 weight percent to 5 weight percent molybdenum trioxide ($MoO_3$).

13. The method of claim 12 wherein said oxidative conditions are provided by adding air to said off-gas immediately prior to said oxidation treatment step such that said off-gas has an oxygen content of from about 6 to 12 percent.

14. The method of claim 12 wherein said reducing conditions are provided by adding ammonia to said off-gas immediately prior to said reduction treatment step.

15. A method of reducing emissions of organic halogen compounds and nitrogen oxides in off-gas comprising:

a first step consisting of directing said off-gas containing organic halogen compounds and nitrogen oxides through a catalyst under reducing conditions at a temperature of from about 150° to 300° C. thereby substantially diminishing nitrogen oxides from said off-gas; and a second step consisting of directing said off-gas previously subjected to said first step through said catalyst under oxidative conditions at a temperature of from about 150° to 500° C. thereby substantially diminishing organic products in said off-gas, wherein said catalyst comprises 70 to 80 weight percent titanium dioxide ($TiO_2$), and from 0.5 weight percent to 10 weight percent of at least one of the donors selected from the group consisting of tungsten trioxide ($WO_3$) and vanadium pentoxide ($V_2O_5$).

16. The method of claim 15 wherein said catalyst further comprises from 0.5 weight percent to 5 weight percent molybdenum trioxide ($MoO_3$).

17. The method of claim 16 wherein said reducing conditions are provided by adding ammonia to said off-gas immediately prior to said reduction treatment step.

18. The method of claim 17 wherein the ammonia content of said off-gas after said reducing treatment is no greater than 20 ppm.

19. The method of claim 18 wherein the ammonia content of said off-gas after said reducing treatment is no greater than 10 ppm.

20. The method of claim 16 wherein said oxidative conditions are provided by adding air to said off-gas immediately prior to said oxidation treatment step such that said off-gas has an oxygen content of from about 6 to 12 percent.

21. The method of claim 12 or 16 wherein said organic compounds and nitrogen oxides are removed from off-gasses emitted from incineration systems.

\* \* \* \* \*

UNITED STATES PATENT AND TRADEMARK OFFICE
CERTIFICATE OF CORRECTION

PATENT NO. : 5,512,259
DATED : April 30, 1996
INVENTOR(S) : Hagemaier, et al

It is certified that error appears in the above-indentified patent and that said Letters Patent is hereby corrected as shown below:

The title page, showing an illustrative figure, should be deleted and substitute therefor the attached title page.

Add the Drawing Sheets, consisting of Figures 1, 2,3 and 4, as shown on the attached pages.

Signed and Sealed this

Fifth Day of November, 1996

Attest:

BRUCE LEHMAN

*Attesting Officer*  *Commissioner of Patents and Trademarks*

United States Patent [19]

Hagenmaier et al.

[11] Patent Number: 5,512,259

[45] Date of Patent: Apr. 30, 1996

[54] PROCESS FOR REDUCING EMISSIONS OF ORGANIC HALOGEN COMPOUNDS FROM INCINERATION SYSTEMS

[75] Inventors: Hanspaul Hagenmaier, Tubingen; Gunther Mittelbach, Witten, both of Germany

[73] Assignee: Babcock Deutsche Babcock Anlagen AG, Krefeld-Uerdingen, Germany

[21] Appl. No.: 690,976

[22] PCT Filed: Oct. 8, 1990

[86] PCT No.: PCT/EP90/01685

§ 371 Date: Jul. 29, 1992

§ 102(e) Date: Jul. 29, 1992

[87] PCT Pub. No.: WO91/04780

PCT Pub. Date: Apr. 18, 1991

[30] Foreign Application Priority Data

| Oct. 6, 1989 | [DE] | Germany | 39 33 480.5 |
| Jul. 3, 1990 | [DE] | Germany | 40 21 135.5 |

[51] Int. Cl.⁶ .................................................. B01D 53/70
[52] U.S. Cl. .................. 423/239.1; 423/240 S; 423/245.3
[58] Field of Search ................ 423/245.3, 240 S, 423/239.1

[56] References Cited

U.S. PATENT DOCUMENTS

| 4,824,360 | 4/1989 | Janka | 423/239.1 |
| 5,087,430 | 2/1992 | Hanada et al. | 423/245.3 |
| 5,254,797 | 10/1993 | Imoto et al. | 423/240 S |
| 5,276,250 | 1/1994 | Hagenmaier et al. | 588/213 |

FOREIGN PATENT DOCUMENTS

| 3531810 | 3/1987 | Germany | B01J 23/22 |
| 3636250 | 4/1988 | Germany | 423/245.3 |
| 3804722 | 8/1989 | Germany | 423/245.3 |
| 793631 | 1/1981 | U.S.S.R. | 423/245.3 |
| WO88/00483 | 1/1988 | WIPO | A62D 3/00 |

OTHER PUBLICATIONS

VDI Report 730, *Report of the Meeting of the VDI Commission for Clean Air*, "Progress in the Thermal, Catalytic, and Sorptive Purification of Off-Gas", Mar. 1–2, 1989, pp. 126, 250 and 251.

*Primary Examiner*—Wayne Langel
*Assistant Examiner*—Stuart L. Hendrickson
*Attorney, Agent, or Firm*—Pennie & Edmonds

[57] ABSTRACT

The invention relates to a method for reducing the emission of organic products of incomplete combustion in the off-gases of incineration systems, wherein the off-gas containing the organic products is treated at a temperature from 150° C. to 500° C., under oxidative conditions, with a denox catalyst or a modified denox catalyst. A method is also provided wherein a denox catalyst may be utilized for removing organic products and nitrogen oxides from off-gases.

21 Claims, No Drawings